United States Patent
Singh

(10) Patent No.: US 10,341,259 B1
(45) Date of Patent: Jul. 2, 2019

(54) PACKET FORWARDING USING PROGRAMMABLE FEATURE PRIORITIZATION

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 15/169,571

(22) Filed: May 31, 2016

(51) Int. Cl.
  *H04L 12/713* (2013.01)
  *H04L 12/741* (2013.01)
  *H04L 12/937* (2013.01)

(52) U.S. Cl.
  CPC .......... *H04L 49/254* (2013.01); *H04L 45/586* (2013.01); *H04L 45/74* (2013.01)

(58) Field of Classification Search
  CPC .... G06F 13/28; G06F 13/362; G06F 13/1605; G06F 13/1652; G06F 13/18
  See application file for complete search history.

(56) References Cited

U.S. PATENT DOCUMENTS

| | | |
|---|---|---|
| 6,467,002 B1 | 10/2002 | Yang |
| 7,376,125 B1 | 5/2008 | Hussain et al. |
| 7,636,356 B1 | 12/2009 | Melman et al. |
| 7,917,680 B2 | 3/2011 | Locker |
| 8,478,707 B1 | 7/2013 | Ong et al. |
| 10,009,291 B1 | 6/2018 | Singh et al. |
| 2002/0021701 A1 | 2/2002 | Lavian et al. |
| 2005/0021491 A1 | 1/2005 | Horgan |
| 2005/0047411 A1 | 3/2005 | Kadambi et al. |
| 2005/0159181 A1 | 7/2005 | Moreshwar et al. |
| 2007/0206602 A1 | 9/2007 | Halabi et al. |
| 2009/0086664 A1 | 4/2009 | Wu |
| 2009/0196245 A1 | 8/2009 | Ji |
| 2010/0046368 A1 | 2/2010 | Kaempfer et al. |
| 2010/0246436 A1 | 9/2010 | Yang et al. |
| 2011/0131385 A1 | 6/2011 | Henriksson et al. |
| 2012/0317322 A1 | 12/2012 | Chirca et al. |
| 2013/0097350 A1* | 4/2013 | Ansari .................. G06F 13/362 710/244 |
| 2013/0128896 A1* | 5/2013 | Munoz ................ H04L 49/9078 370/412 |
| 2013/0339545 A1 | 12/2013 | Shenoi et al. |
| 2014/0101663 A1 | 4/2014 | Dickson |
| 2015/0067291 A1 | 3/2015 | Miyamoto et al. |
| 2015/0236982 A1 | 8/2015 | Edsall et al. |

(Continued)

OTHER PUBLICATIONS

U.S. Appl. No. 14/977,120, filed Dec. 21, 2015, Titled: Programmable Switching Fabric for Dynamic Path Selection.

*Primary Examiner* — Jung H Park
(74) *Attorney, Agent, or Firm* — Kilpatrick Townsend & Stockton LLP

(57) ABSTRACT

A network device can utilize multiple priority arbiters to support different programmable priorities for different virtual routing and forwarding (VRF) subsystems. Each priority arbiter can be logically connected to all the VRF subsystems in the network device. Each priority arbiter can support a set of features corresponding to functional requirements of a VRF subsystem. A particular priority arbiter can be selected from the multiple priority arbiters based on an association of the VRF subsystem to that priority arbiter.

20 Claims, 12 Drawing Sheets

(56) References Cited

U.S. PATENT DOCUMENTS

| | | |
|---|---|---|
| 2016/0044695 A1 | 2/2016 | Gunner |
| 2016/0147687 A1* | 5/2016 | Check .................. G06F 1/24 |
| | | 710/117 |
| 2016/0373362 A1 | 12/2016 | Cheng et al. |
| 2017/0075838 A1* | 3/2017 | Nooney ............. G06F 13/37 |

* cited by examiner

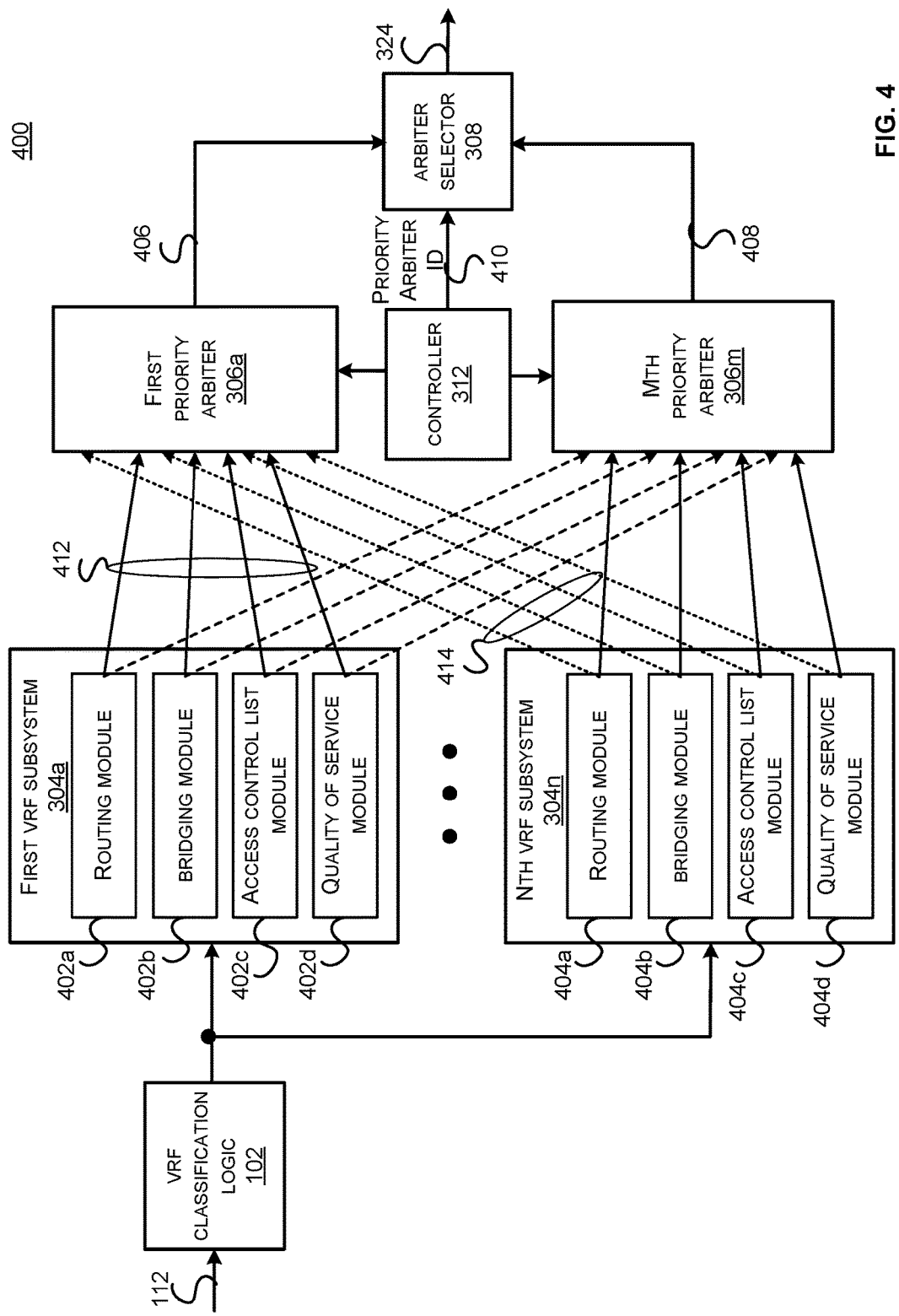

| FIRST SET OF FEATURES 500 |
|---|
| ACL |
| STP |
| LPM |
| L3-OPTIONS |
| L3-TUNNELING |
| QoS |
| L2-BRIDGING |
| VLAN-TABLE |
| PORT-VLAN-TABLE |

FIG. 5A

| SECOND SET OF FEATURES 502 |
|---|
| ACL |
| LPM |
| L3-OPTIONS |
| L3-TUNNELING |
| QoS |
| L2-BRIDGING |
| VLAN-TABLE |
| PORT-VLAN-TABLE |

FIG. 5B

| MTH SET OF FEATURES 504 |
|---|
| ACL |
| LPM |
| L3-OPTIONS |
| L3-TUNNELING |
| QoS |

| SYSTEM EVENT 600a | ACTION CODE 600b |
|---|---|
| BROADCAST PACKET | 0 |
| MULTICAST PACKET | 1 |
| WELL KNOWN MEDIA ACCESS CONTROL (MAC) ADDRESS HIT | 2 |
| VLAN CHECK FAIL | 14 |
| STP CHECK FAIL | 15 |
| ⋮ | ⋮ |
| ⋮ | ⋮ |
| IP TIME-TO-LIVE (TTL) ERROR | 26 |
| LPM ROUTING TABLE HIT | 27 |
| IPv4 OPTIONS HIT | 29 |
| IPv6 EXTENSION HEADERS HIT | 30 |
| ACL SECURITY HIT | 31 |
| QUALITY OF SERVICE (QOS) MISS | 32 |
| MAXIMUM TRANSMISSION UNIT (MTU) ERROR | 33 |
| ADDRESS RESOLUTION PROTOCOL (ARP) NEEDED | 35 |

FIG. 6

| ACTION CODE 700a | PRIORITY 700b | DECISION 700c |
|---|---|---|
| 0 | 1 | FWD |
| 1 | 10 | FWD2CPU |
| 2 | 25 | DROP |
| 14 | 98 | DROP |
| 15 | 30 | FWD |
| ... | ... | ... |
| 27 | 40 | DROP |
| 30 | 75 | DROP |
| 32 | 38 | FWD |
| 35 | 50 | COPY2CPU |

FIG. 7A

| ACTION CODE 702a | PRIORITY 702b | DECISION 702c |
|---|---|---|
| 2 | 5 | FWD2CPU |
| 14 | 10 | FWD |
| 26 | 25 | DROP |
| 27 | 77 | FWD |
| ... | ... | ... |
| 29 | 40 | FWD |
| 30 | 96 | DROP |
| 35 | 98 | DROP |

FIG. 7B

| ACTION CODE 704a | PRIORITY 704b | DECISION 704c |
|---|---|---|
| 1 | 1 | FWD2CPU |
| 15 | 32 | FWD |
| 26 | 25 | DROP |
| ... | ... | ... |
| 29 | 44 | DROP |
| 30 | 35 | DROP |
| 31 | 85 | FWD |
| 32 | 38 | COPY2CPU |
| 33 | 55 | FWD |

FIG. 7C

| MAPPING TABLE 322 | |
|---|---|
| VRF IDENTIFIER (ID) 800 | PRIORITY ARBITER IDENTIFIER (ID) 410 |
| 1 | 1 |
| 2 | 2 |
| 5 | 3 |
| 8 | 1 |
| 10 | 4 |
| 11 | 4 |
| 12 | 6 |
| 14 | 5 |

FIG. 8

PACKET FORWARDING USING PROGRAMMABLE FEATURE PRIORITIZATION

BACKGROUND

Advanced packet forwarding systems can support multiple virtual routing and forwarding (VRF) subsystems. In Internet Protocol (IP) based computer networks, VRF technology can provide an ability to configure different virtual routers on the same hardware. For example, multiple instances of the virtual routers can coexist within a same network device. In some implementations, each VRF subsystem can represent a customer, an organization, or a department in an organization. Thus, VRF technology may be used to isolate different customers, departments or organizations from one another using the same physical infrastructure.

Generally, a packet entering a network device may be processed by multiple packet processors inside a VRF subsystem. Each packet processor can make a decision about the packet and forward its decision to a priority arbiter. The priority arbiter considers the decisions from all the participating packet processors for each VRF subsystem and makes a decision on the packet based on a pre-configured priority for each VRF subsystem. For example, the decision can be to drop the packet or to forward the packet. Generally, different VRF subsystems may support different functionalities. For example, a first VRF subsystem may only support layer 3 (L3) functionality, a second VRF subsystem may only support layer 2 (L2) functionality and a third VRF subsystem may only support security related functionality. However, the priority arbiter generates a final decision based on the pre-configured priorities associated with each VRF subsystem even though some of the decisions may not be relevant. Thus, network devices employing single priority arbiters may result in complex and hard to maintain deployment architecture when supporting multiple VRF subsystems.

BRIEF DESCRIPTION OF THE DRAWINGS

Various embodiments in accordance with the present disclosure will be described with reference to the drawings, in which:

FIG. 4 illustrates an apparatus utilizing multiple priority arbiters, in accordance with one embodiment of the disclosed technologies;

FIG. 5A illustrates a first set of features supported by a first priority arbiter, in one embodiment of the disclosed technologies;

FIG. 5B illustrates a second set of features supported by a second priority arbiter, in one embodiment of the disclosed technologies;

FIG. 5C illustrates an $M^{th}$ set of features supported by an $M^{th}$ priority arbiter, in one embodiment of the disclosed technologies;

FIG. 6 illustrates a table comprising system events and corresponding action codes, in one embodiment of the disclosed technologies;

FIG. 7A illustrates a table comprising a mapping of action codes to priorities and decisions for a first priority arbiter, in one embodiment of the disclosed technologies;

FIG. 7B illustrates a table comprising a mapping of action codes to priorities and decisions for a second priority arbiter, in one embodiment of the disclosed technologies;

FIG. 7C illustrates a table comprising a mapping of action codes to priorities and decisions for an Nth priority arbiter, in one embodiment of the disclosed technologies;

FIG. 8 illustrates a table comprising a mapping table for a VRF identifier to a priority arbiter identifier, in one embodiment of the disclosed technologies;

DETAILED DESCRIPTION

Figure 1:
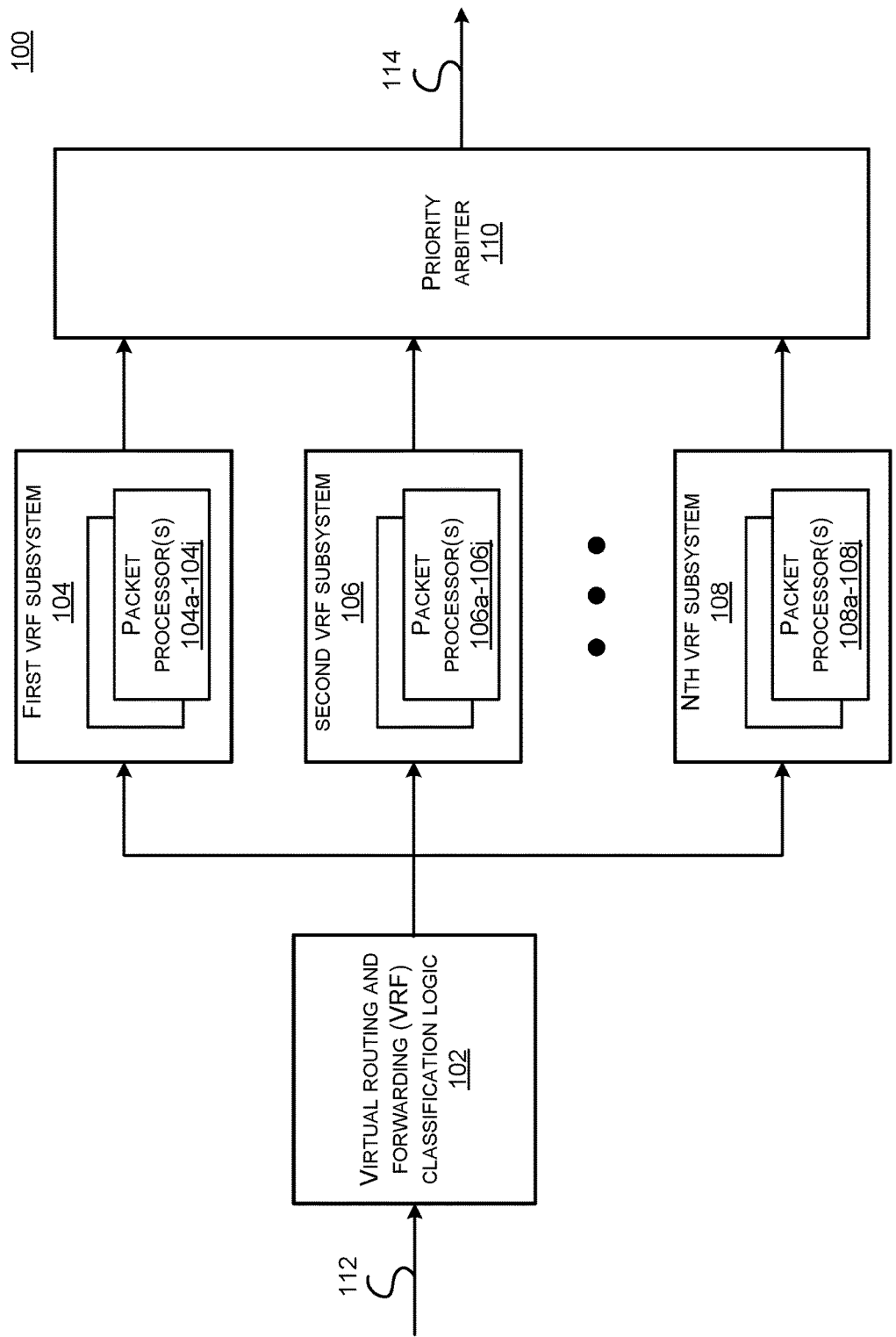
FIG. 1 illustrates a network device utilizing a single priority arbiter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Generally, a network device may include functionality to interconnect different devices on a network or over networks using a plurality of ports. For example, the network device may include a switch, a router, a hub, a network enabled computer, or any suitable network enabled device. The network device may support any packet protocol and may operate at the data link layer (Layer 2) or the network layer (Layer 3) of the OSI (open systems interconnection) model. For example, the packet may be an Internet Protocol (IP) packet that can carry data over a packet switched network (e.g., the Internet) based on a network protocol (e.g., Transmission Control Protocol (TCP)/IP). The network device may receive a packet on one of its ports from a source device (e.g., a computer) for forwarding it to a destination device (e.g., another computer or a router). For example, the packet may be part of a traffic stream that includes a sequence of packets. In some instances, the packet can be an Ethernet frame that includes an IP packet.

Advanced packet forwarding systems can support virtual routing and forwarding (VRF) technology. In IP based computer networks, VRF technology can provide a network device an ability to configure different virtual routers on the same hardware using multiple VRF subsystems. Each VRF subsystem can create a virtual router using part of the same physical router; hence, multiple instances of virtual routers can coexist within the same network device. Having independent routing instances can allow the use of the same or overlapping IP addresses without conflicting with each other. In some instances, multiple VRF subsystems may be used to support different customers, organizations, or departments in an organization using the same physical infrastructure in isolation from one another. For example, in some instances, multiple VRF subsystems may be used to create separate virtual private networks (VPNs) for different customers. Multiple VRF subsystems can support multiple packet forwarding systems with their independent routing tables containing respective set of routes, independent switching tables containing respective Layer 2 (L2) addresses and virtual local area networks (VLANs), independent access control list (ACL) subsystems containing respective security and packet detection lists, and independent quality of service (QoS) configurations, etc.

Generally, a packet entering a network device through one of the ports of a network device is classified in order to be assigned to one of the VRF subsystems. Each VRF subsystem may have its own functional requirement. For example, a first customer may use a first VRF subsystem with features related to L2 switching, VLANs, spanning tree protocol (STP), routing, ACLs, and QoS. A second customer may use a second VRF subsystem with features related to only L2 bridging, VLANs, and STP. A third customer may use a third VRF subsystem with features related to only L3, ACL and QoS. Accordingly, the packet may be processed by multiple packet processors for a given VRF subsystem based on the associated features. In most instances, each participating packet processor for the given VRF subsystem may make a decision about the packet based on the features associated with the given VRF subsystem. For example, the decision may include whether the packet should be dropped, forwarded, copied to multiple ports, etc., and a port for forwarding the packet as necessary. Each packet processor for the respective VRF subsystem that participates in making the decision regarding the packet can provide its respective decision to a priority arbiter. The priority arbiter can consider decisions from all the VRF subsystems and make a decision based on pre-configured priorities associated with each VRF subsystem. For example, the decision can be to drop the packet (DROP), forward the packet to another device (FWD) or forward to a central processor unit (FWD2CPU), or copy to the CPU (COPY2CPU). In various implementations, the forward may include forward to a port, forward to multiple ports, or mirroring to multiple ports.

Traditional network devices using a single priority arbiter may be limited to considering decisions from all the VRF subsystems even though some of the decisions provided by the non-participating VRF subsystems may not be very relevant. For example, the third customer may only deploy a L3 network and therefore may not care about the STP state of the L3 ports; however, the third VRF subsystem may still have to provide relevant values to the priority arbiter to make a valid decision. Thus, it may be a challenging task to service different requirements of different departments using the same physical infrastructure of the network. Hence, network devices employing single priority arbiters may result in complex and hard to maintain deployment architecture when supporting multiple VRF subsystems. This can cause frustration and waste of resources for the customers.

Various embodiments of the disclosed technologies can utilize a number of priority arbiters to support different priorities for different VRF subsystems based on their associated functional requirements. The embodiments can allow a programmable selection of a priority arbiter from a plurality of priority arbiters for a specific VRF subsystem which meets the requirements of that VRF subsystem. According to the embodiments, each priority arbiter from the plurality of priority arbiters can be logically connected to all the VRF subsystems using the same physical connection that exists between the physical router and each of the priority arbiters.

For example, each VRF subsystem may be configured to communicate with each priority arbiter in a virtualized environment by abstracting the same physical infrastructure. In one embodiment, one set of features can be assigned to one priority arbiter. Each set of features may include a combination of unique deployment features supported by the respective priority arbiter. Each priority arbiter can be programmed with a set of priorities to make decisions based on its associated set of features. In some embodiments, the number of priority arbiters can be determined based on a number of unique sets of features. A priority arbiter can be selected from the plurality of priority arbiters to provide a final decision for the packet per the requirements of the specific VRF subsystem. The priority arbiter can be selected from the plurality of priority arbiters using a mapping of the specific VRF subsystem to the selected priority arbiter based on a configuration.

Each VRF subsystem may include multiple packet processors, e.g., a routing module, a bridging module, an ACL module, and a QoS module. Each of the packet processors for a given VRF subsystem may be configured to perform different functionalities. However, for each VRF subsystem, certain functionalities may have higher priorities over other functionalities. For example, a first VRF subsystem may have higher priority for layer 3 (L3) functionality, a second VRF subsystem may have higher priority for layer 2 (L2) functionality, a third VRF subsystem may have higher priority for ACL functionality, and so on. Embodiments of the disclosed technologies can allow programming different priority values for different priority arbiters to meet specific functional requirements of different VRF subsystems. For example, a first priority arbiter can be programmed with a first set of priorities based on a first set of features, a second priority arbiter can be programmed with a second set of priorities based on a second set of features, and so on. Thus the embodiments can allow different priorities for different VRF subsystems based on their respective functional requirements using multiple priority arbiters. Each priority arbiter may be implemented using minimal chip area. Hence, according to various embodiments, multiple priority arbiters with programmable priorities for different VRF subsystems can provide a flexible and easy to maintain architecture as compared to current architectures at a minimal incremental cost.

FIG. 1 illustrates a network device 100 utilizing a single priority arbiter.

The network device 100 may include a plurality of VRF subsystems, e.g., a first VRF subsystem 104, a second VRF subsystem 106, and an $N^{th}$ VRF subsystem 108. Each of the plurality of VRF subsystems may be coupled to a VRF classification logic 102 and a priority arbiter 110. Each of the plurality of VRF subsystems may include multiple packet processors. For example, the first VRF subsystem 104 may include packet processors 104a-104j, the second VRF subsystem 106 may include packet processors 106a-106j, and the $N^{th}$ VRF subsystem 108 may include packet processors 108a-108j.

The VRF classification logic 102 may be configured to classify an incoming packet 112 for assigning to a VRF subsystem from the plurality of VRF subsystems. The packet 112 may be received via a network port using an input interface. The packet 112 may include payload data and a header that can include packet information. For example, the header may include source and destination physical addresses (e.g., IP addresses of respective devices), a protocol version (e.g., IPv4 or IPv6), a length of the packet, error correction data, and any other useful information. In some instances, the packet 112 can be a layer 2 (L2) packet, e.g., an Ethernet packet. For example, the header of the L2 packet may include source and destination addresses (e.g., media access control (MAC) addresses) of the source and destination devices connected to the network device in a network. In some implementations, the VRF classification logic 102 may only receive certain parts of the packet 112, e.g., the header.

The VRF classification logic 102 may classify the packet 112 in order to assign the packet 112 to one of the VRF subsystems for processing. In some implementations, the classification may be based on a number of criteria, e.g., the port on which the packet 112 came in, a VLAN port the packet 112 belongs to, the IP address range associated with the packet 112, or any other suitable criteria. For example, the packet 112 may be classified to belong to the first VRF subsystem 104, the second VRF subsystem 106, or the $N^{th}$ VRF subsystem 108.

The multiple packet processors associated with each VRF subsystem receiving the packet 112 may process the packet 112 based on the functional requirements of the respective VRF subsystem. In some implementations, the participating packet processors for each VRF subsystem may make a decision about forwarding the packet 112. The decision may be based on a context and a type of the packet. For example, the decision may include whether the packet should be dropped, forwarded, copied to multiple ports, etc., and a port for forwarding the packet as necessary. In some implementations, the multiple packet processors may include a routing module, a bridging module, an access-control-list (ACL) module, a quality-of-service (QoS) module and any other relevant modules. The routing module may make a decision to forward the packet to a particular port for routing to a particular destination (e.g., another device or network) based on certain fields in the packet (e.g., IP header, routing address, routing type, etc.). Packets with different IP options may be handled by the routing module differently based on the configuration of the system. The bridging module may determine a destination for forwarding the packet based on a layer 2 header of the packet. The bridging module may accordingly make a decision to forward the packet to a destination port or flood the packet to all the ports. The ACL module may perform the function of controlling access to the network coupled to the switch. For example, the ACL module can determine if the packet is allowed to access the network based on certain fields of the packet. The QoS module can provide fairness for access to the resources in the switch as well as the network. For example, the QoS module can limit traffic from a certain port to a certain rate, e.g., by making a decision to drop the packet.

The participating packet processors for each VRF subsystem may make a decision regarding the packet which may be independent of decisions made by packet processors from other VRF subsystems. For example, the decisions made by the packet processors 104a-104j may be based on features associated with layer 3 (L3) functionality, the decisions made by the packet processors 106a-106j may be based on features associated with layer 2 (L2) functionality, and the decisions made by the packet processors 108a-108j may be based on security related features. The packet forwarding decisions made by each participating packet processor associated with each VRF subsystem may be provided to the priority arbiter 110. For example, each of the packet processors 104a, . . . , 104j for the first VRF subsystem 104 may provide a respective decision to the priority arbiter 110. Similarly, each of the packet processors 106a, . . . , 106j for the second VRF subsystem 106 may provide a respective decision to the priority arbiter 110, and each of the packet processors 108a, . . . , 108j for the $N^{th}$ VRF subsystem 108 may provide a respective decision to the priority arbiter 110. The priority arbiter 110 may be configured to perform arbitration based on the priority. For example, the priority arbiter 110 may consider all the decisions received from each packet processor and may generate a final decision 114 using a set of priorities. In some implementations, the priority arbiter 110 may generate the final decision 114 based on the decision associated with a highest priority value. The final decision 114 may be used by a decision logic (not shown) to perform an action on the packet 110. As a result, the packet may be dropped, forwarded to a processor, copied to the processor, forwarded to multiple ports, or forwarded to a port.

In some instances, each VRF subsystem may be used for a separate department in an organization. Each department may have different priorities for forwarding a packet based on its associated functional requirements. For example, a first department may want to connect a L2 network to a L3 network, a second department may only deploy L3 functionality, and a third department may only have ACL as high priority. Further, each department may have different QoS configurations and hence different priorities for respective QoS configurations.

Generally, the priority arbiter 110 may use pre-configured priorities associated with each VRF subsystem to make the final decision 114. For example, the priority arbiter 110 may use a first set of priorities associated with the first VRF subsystem 104, a second set of priorities associated with the second VRF subsystem 106, and an $N^{th}$ set of priorities associated with the $N^{th}$ VRF subsystem 108. As discussed previously, the first set of priorities may be based on the functionalities supported by the first VRF subsystem 104, the second set of priorities may be based on the functionalities supported by the second VRF subsystem 106, and the $N^{th}$ set of priorities may be based on the functionalities supported by the $N^{th}$ VRF subsystem 108. For example, in some instances, the first VRF subsystem 104 may have higher priority for L2 related functionality, the second VRF subsystem 106 may have higher priority for L3 related functionality, and the $N^{th}$ VRF subsystem 108 may have higher priority for security related functionality. In order to generate the final decision 114, the priority arbiter 110 may consider the pre-configured priorities associated with all the participating packet processors irrespective of whether they have participated in generating a valid decision regarding the packet. For example, in some instances, different VRF subsystems may have conflicting requirements for network behavior based on the functionalities supported by the respective VRF subsystems. Thus, it may be challenging to generate a final decision that can meet the requirements of all the different VRF subsystems using a single priority arbiter.

Figure 2:
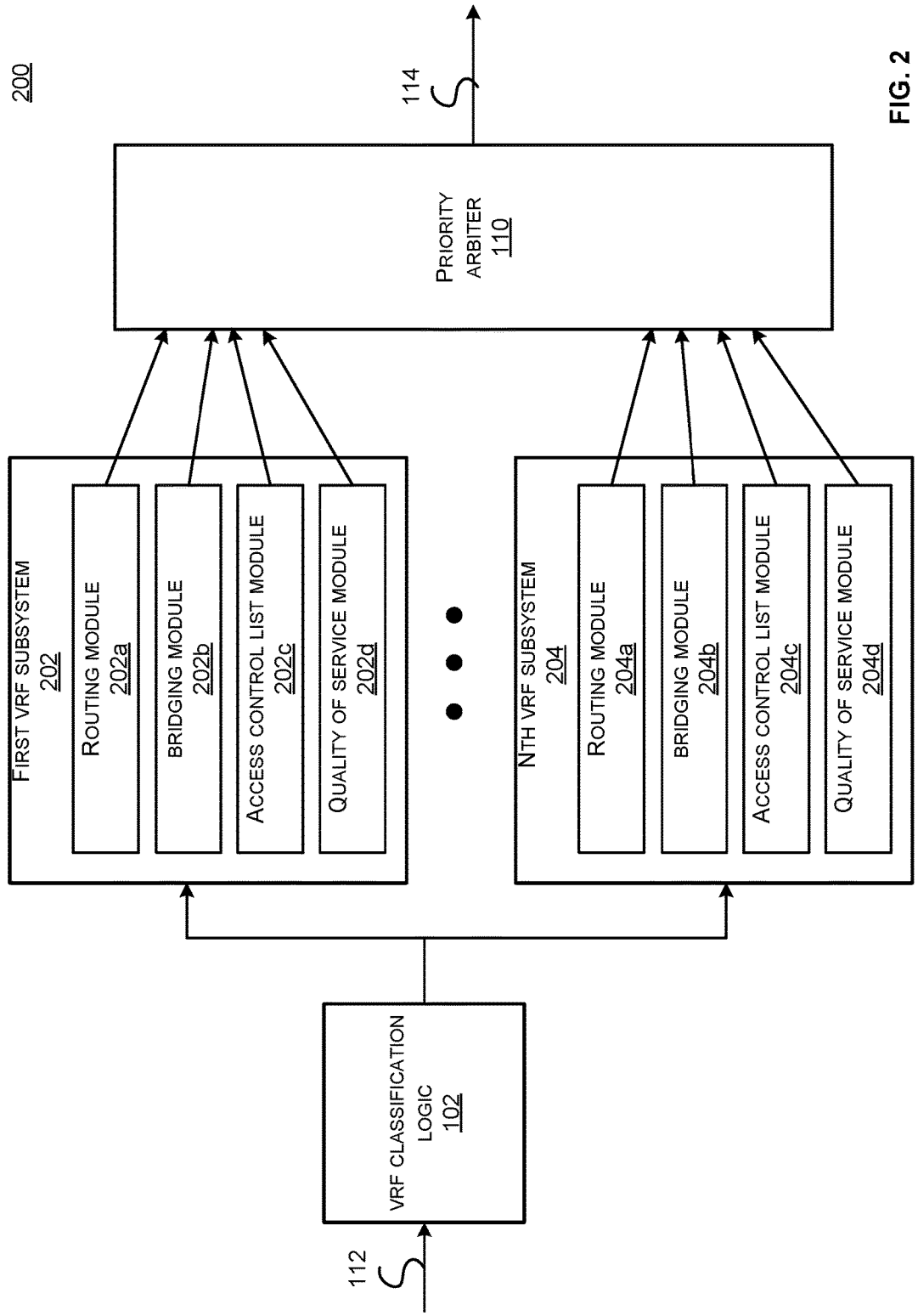
FIG. 2 illustrates a plurality of VRF subsystems for the network device utilizing the single priority arbiter.

FIG. 2 illustrates a plurality of VRF subsystems for a network device 200 utilizing a single priority arbiter.

The network device 200 be similar to the network device 100 as discussed with reference to FIG. 1. The network device 200 may include the VRF classification logic 102, the priority arbiter 110 and a plurality of VRF subsystems, e.g., a first VRF subsystem 202 and an Nth VRF subsystem 204.

The first VRF subsystem 202 may include a plurality of packet processors, e.g., a routing module 202a, a bridging module 202b, an access control list (ACL) module 202c and a quality of service (QoS) module 202d. The routing module 202a, bridging module 202b, ACL module 202c and the QoS module 202d may be part of the packet processors 104a-

104*j* as discussed with reference to FIG. 1. Note that the first VRF subsystem 202 may include additional packet processors which are not shown in FIG. 2 for the purposes of simplicity. The plurality of packet processors from the first VRF subsystem 202 may process the incoming packet 112 based on functionalities supported by the first VRF subsystem 202.

The $N^{th}$ VRF subsystem 204 may include a plurality of packet processors, e.g., a routing module 204*a*, a bridging module 204*b*, an ACL module 204*c*, and a QoS module 204*d*. The routing module 204*a*, bridging module 204*b*, ACL module 204*c*, and the QoS module 204*d* may be part of the packet processors 108*a*-108*j* as discussed with reference to FIG. 1. Note that the $N^{th}$ VRF subsystem 204 may include additional packet processors which are not shown in FIG. 2 for the purposes of simplicity. The plurality of packet processors from the $N^{th}$ VRF subsystem 204 may process the incoming packet 112 based on functionalities supported by the $N^{th}$ VRF subsystem 204.

The routing module 202*a* may process the incoming packet 112 and provide a decision regarding the packet 112 to the priority arbiter 110, e.g., to forward the packet 112, to drop the packet 112, or to copy the packet 112 to the CPU. For example, the packet 112 may be an IP packet or an Ethernet packet. Forwarding the packet 112 may include forwarding to the CPU or to another device (e.g., a computer or a router). The CPU (not shown) may reside on or off the network device 200 based on the implementation and may be communicatively coupled to the priority arbiter 110. In some instances, the routing module 202*a* may receive the packet 112 on one of the ports of the network device 200 and may route the packet 112 to another port. The packet 112 may be destined to another computer connected to the network device 200 or to another router for routing the packet to a remote network. Generally, the packet 112 may include a header and a payload. For example, the header may include source and destination addresses, a packet length, protocol information, error detection codes, and any other suitable information. The routing module 202*a* may process the header of the incoming packet 112 to determine a routing address based on the source and destination addresses (e.g., IP addresses). In some implementations, the routing module 202*a* may utilize a routing table that can include routes to particular destinations. For example, the routing table may be in the form of a database implemented in a memory (not shown). Based on various paths available in the routing table, the routing module 202*a* can determine a port for forwarding the packet 112 to in order to route the packet 112 to a particular destination. The routing module 202*a* may support IPv4 routing, IPv6 routing, or a policy based routing as appropriate.

Routing modules from other VRF subsystems, e.g., the routing module 204*a*, may include similar functionality as the routing module 202*a*. However, in some instances, each routing module may include its own independent routing table. For example, the routing module 202*a* may include a first routing table that includes routes to a first set of destinations and the routing module 204*a* may include an $N^{th}$ routing table that includes routes to an $N^{th}$ set of destinations.

The bridging module 202*b* may be configured to perform switching of the packets. In some embodiments, the packets may be Ethernet packets or Ethernet frames. The bridging module 202*b* may process the packet 112 and provide a decision regarding the packet 112 to the priority arbiter 110. For example, the decision may include forwarding the packet 112, dropping the packet 112, or copying the packet 112 to the CPU. In some instances, the bridging module 202*b* may process a L2 header of the packet 112 and may perform a task of learning the source MAC address into its routing tables. The bridging module 202*b* may determine if the destination of the packet 112 is known based on the destination address and its routing table. If the destination is known, the bridging module 202*b* may make a decision to forward the packet 112 to a corresponding port. If the destination is not known, the bridging module 202*b* may make a decision to flood (or copy) the packet 112 to all the ports. For example, if the packet 112 came in on a port that belongs to a specific virtual local area network (VLAN) in a bridge, the packet 112 may be flooded to all the ports in that VLAN. In some instances, the bridging module 202*b* may support broadcast functionality associated with layer 2. In some instances, the bridging module 202*b* may support the spanning tree protocol (STP). For example, the STP may be used to prevent loops when there are redundant paths in a network, e.g., an Ethernet local area network.

Bridging modules from other VRF subsystems, e.g., the bridging module 204*b*, may include similar functionality as the bridging module 202*b*. However, in some instances, each bridging module may include its own independent routing table. For example, the bridging module 202*b* may include a first routing table that includes routes to a first set of destinations and the bridging module 204*b* may include an $N^{th}$ routing table that includes routes to an $N^{th}$ set of destinations. In some other instances, the bridging module 202*b* may support STP and the bridging module 204*b* may not support STP.

The ACL module 202*c* may process the packet 112 and provide a decision regarding the packet 112 to the priority arbiter 110. For example, the decision may include forwarding the packet 112, dropping the packet 112, or copying the packet 112 to the CPU. The ACL module 202*c* may be configured to control access to a network. For example, the network device 200 may be communicatively coupled to one or more networks (not shown). In some instances, access to a particular network may be allowed or denied based on certain fields of the packet 112. For example, in some instances, certain type of packets or a certain range of IP addresses may or may not be allowed to access certain networks. In some instances, the ACL module 202*c* may process the packet 112 based on a policy. In some implementations, the ACL module 202*c* may process the packet 112 in tandem with the QoS module 202*d* to perform certain functionalities associated with quality of service.

ACL modules from other VRF subsystems, e.g., the ACL module 204*c*, may include similar functionality as the ACL module 202*c*. However, in some instances, each ACL module may include its own independent access control list for access to different networks. For example, the ACL module 202*c* may allow access to a certain network which the ACL module 204*c* does not allow access to. In some other instances, each ACL module may process the packet using their respective policies.

The QoS module 202*d* may process the packet 112 and provide a decision regarding the packet 112 to the priority arbiter 110. For example, the decision may include forwarding the packet 112, dropping the packet 112 or copying the packet 112 to the CPU. In some instances, the QoS module 202*d* may provide fairness in terms of access to certain resources in the network as well as inside the network device 200. For example, in some instances, the QoS module 202*d* may provide a decision to drop packets to limit traffic from a certain port to a certain rate. The QoS module 202*d* may determine when the limit is exceeded so that certain packets can be dropped by the QoS module 202d or can be marked to be dropped by other modules along the path through the network device 200 as necessary.

QoS modules from other VRF subsystems, e.g., the QoS module 204d, may include similar functionality as the QoS module 202d. However, in some instances, each QoS module may provide access to different resources for the incoming packet 112.

Generally, the packet 112 may be received on a first port of the network device 200 and may be forwarded to a second port of the network device 200. For example, the packet 112 may be destined to another computer connected to the network device 200 or to a router for routing the packet 112 to a remote network. In some instances, the packet 112 may be forwarded to multiple ports, or mirrored to multiple ports. In some instances, the packet 112 may be a control packet and can be forwarded to the CPU. In some instance, the packet 112 may be forwarded to the CPU to handle certain exception conditions. In some instances, the packet 112 may be copied to the CPU. For example, in some instances, an audit may need to be performed on a traffic stream going from one computer to another computer or the traffic stream may need to be monitored without interrupting the traffic. Copying the packets for that traffic stream to the CPU can allow the software running on the CPU to perform the necessary actions as needed. In some instances, the packet 112 may be dropped based on a policy. For example, the packet 112 may belong to an IP address range that may not be allowed to go through based on a policy associated with the corresponding ACL module. In some instances, the packet 112 may belong to certain L2 addresses that may not be allowed based on a policy associated with the corresponding bridging module and may need to be dropped.

Generally, the priority arbiter 110 may process the decisions provided by multiple packet processors associated with different VRF subsystems and generate the decision 114 regarding the packet 112 based on the pre-configured priorities associated with the respective decisions. For example, the priority may be programmed at a boot time or start time either in the priority arbiter 110 or in the respective modules for each VRF subsystem which process the packet. In some implementations, the priority arbiter 110 may generate the decision 114 based on a highest priority value. In most instances, priorities may be programmed based on different functionalities supported by each VRF subsystem. However, the priority arbiter 110 may have to consider decisions from all the participating packet processors even though some of the decisions provided by respective packet processors may not be relevant. For example, the first VRF subsystem 202 may support only L3 functionality and the $N^{th}$ VRF subsystem 204 may only support ACL functionality. However, the priority arbiter 110 may have to consider priorities associated with the ACL functionality for the first VRF subsystem 202 and priorities associated with the L3 functionality for the $N^{th}$ VRF subsystem 204 in generating the final decision 114. In some instances, the priority arbiter 110 may receive conflicting decisions from different VRF subsystems and may have to provide the final decision 114 using the decisions provided by all the VRF subsystems. Since the priorities are pre-configured, supporting independent VRF subsystems can result in a complex system requiring high maintenance. Hence, it may be desirable to have the final decision determined using priorities associated with specific features.

Various embodiments of the disclosed technologies utilize multiple priority arbiters to support different programmable priorities for different VRF subsystems. Each VRF subsystem can be logically connected to each of the priority arbiters. Each priority arbiter can be programmed with a set of priorities to support features associated with one or more VRF subsystems. The set of priorities corresponding to a priority arbiter may be programmed by a controller based on the set of features supported by that priority arbiter. For example, a first set of features supported by a first priority arbiter may be associated with L2 (e.g., bridging, VLAN, STP), L3 (e.g., LPM, tunneling, IP options), ACL, and QoS, a second set of features supported by a second priority arbiter may be associated with only L3 (e.g., LPM, tunneling, IP options), and an Nth set of features supported by an $N^{th}$ priority arbiter may be associated with L3 (e.g., LPM, tunneling, IP options), ACL and QoS. Packet forwarding decisions for a given VRF subsystem may be forwarded to all the active priority arbiters. Each priority arbiter can generate a respective decision on forwarding the packet. A final decision from a priority arbiter is selected based on a pre-determined mapping of the given VRF subsystem to that priority arbiter.

Figure 3:
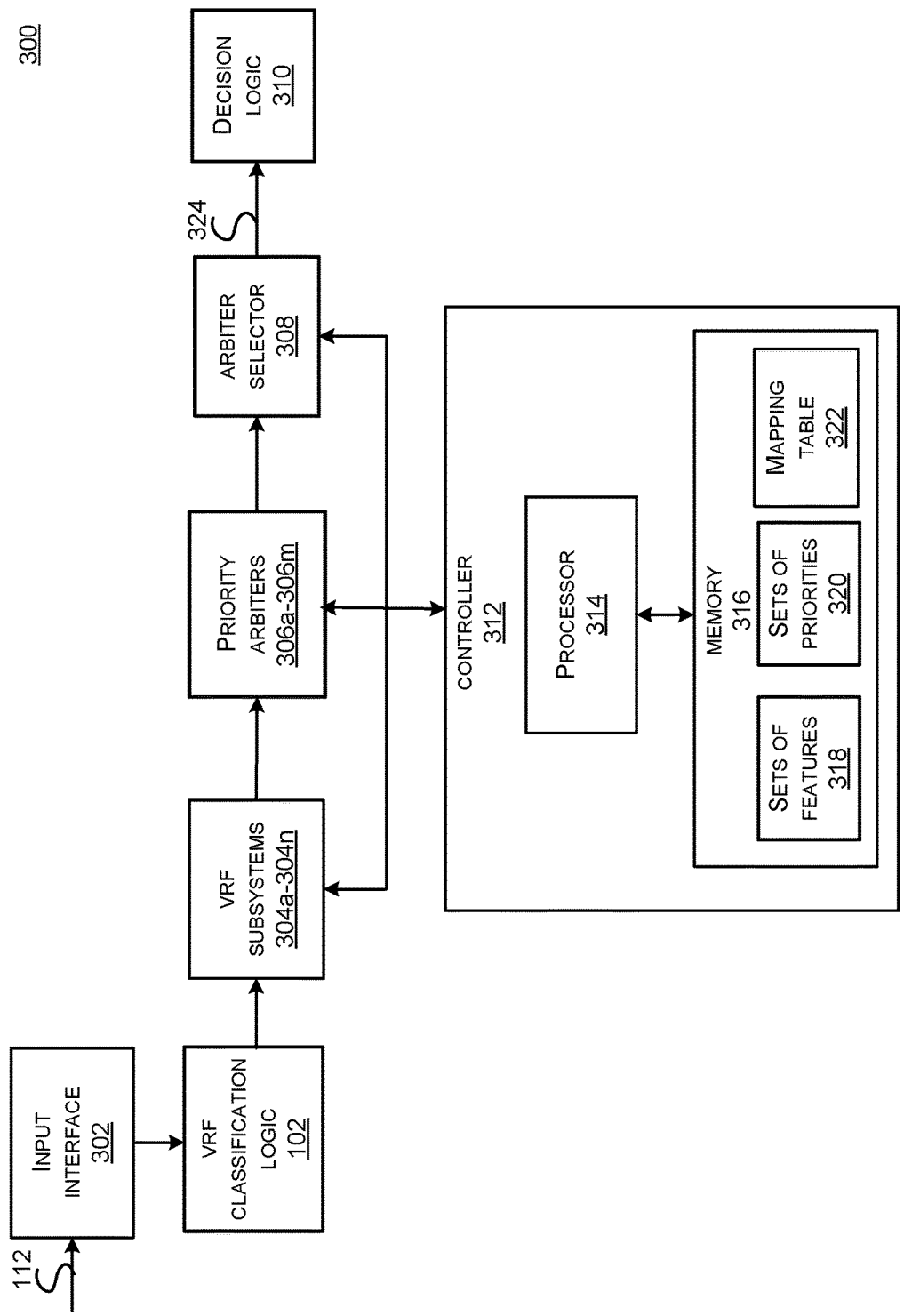
FIG. 3 illustrates a network device utilizing multiple priority arbiters, in accordance with one embodiment of the disclosed technologies.

FIG. 3 illustrates a network device 300 utilizing multiple priority arbiters, in one embodiment of the disclosed technologies. The network device 300 may include an input interface 302, the VRF classification logic 102, a plurality of VRF subsystems 304a-304n, a plurality of priority arbiters 306a-306m, an arbiter selector 308, decision logic 310, and a controller 312. In some implementations, "m" and "n" can be positive integers. For example, "m" can be 12 and "n" can be 16. In one embodiment, one priority arbiter can be assigned to multiple VRF subsystems. For example, "m" can be smaller than "n". In another embodiment, one priority arbiter can be assigned to one VRF subsystem, e.g., "m" and "n" can be the same. The network device 300 may be implemented as a system-on-chip (SoC), a field programmable gate array, a system in package (SiP), an application specific integrated circuit (ASIC), or any suitable circuit. Note that the network device 300 may include more or fewer components than shown in FIG. 3. In one implementation, the network device 300 may include some components of the network device 1100 as described with reference to FIG. 11.

The input interface 302 may be configured to receive the incoming packet 112 via a network. For example, the network device 300 may be communicatively coupled to one or more networks (not shown). In one implementation, the input interface 302 may receive the incoming packet 112 using a network interface. For example, the network interface may include one or more network ports (e.g., Ethernet ports) to communicate with other networking devices (not shown) on the network using a network protocol, e.g., Transmission Control Protocol/Internet Protocol (TCP/IP), Domain Name System (DNS), Hypertext Transfer Protocol (HTTP), Dynamic Host Configuration Protocol (DHCP), etc. In some implementations, one or more ports of the network device 300 may be assigned to a single virtual local area network (VLAN) or different VLANs. In some embodiments, the network device 300 may be communicatively coupled to one or more devices using a special link, also called a trunk. As discussed with reference to FIG. 1, the incoming packet 112 may include payload data and a packet header that can include packet information. For example, the packet header may include source and destination physical addresses (e.g., IP addresses of respective devices), a protocol version (e.g., IPv4 or IPv6), a length of the packet, error correction data, and any other useful information.

As discussed with reference to FIG. 1, the VRF classification logic 102 may be configured to classify the incoming packet 112 based on a number of criteria. In some implementations, the VRF classification logic 102 may receive only the packet header or certain fields of the packet header. In some instances, the packet 112 can be a L2 packet, e.g., an Ethernet packet. For example, the header of the L2 packet may include source and destination addresses (e.g., media access control (MAC) addresses) of the source and destination devices connected to the network device 300 in a network. The VRF classification logic 102 may classify the packet 112 based on a number of criteria and assign to one of the VRF subsystems 304a-304n for processing. In some embodiments, the VRF classification logic 102 may determine a VRF identifier (ID) associated with the current incoming packet based on a configuration, e.g., based on certain header bits of the incoming packet. For example, in some implementations, a VRF ID may be associated with each VRF subsystem from the VRF subsystems 304a-304n. The VRF classification logic 102 may classify the packet 112 to belong to one of the VRF subsystems 304a-304n based on the VRF ID associated with the packet 112.

The controller 312 may include a processor 314, and a memory 316. The processor 314 may include one or more processing cores, e.g., an x86 or ARM® compatible processor cores. The processor 314 may be configured to execute instructions stored in a computer-readable medium. For example, the instructions may include instructions to implement some of the functionality implemented by the controller 312. In some embodiments, the computer-readable medium may be part of the memory 316. The controller 312 may or may not be a part of the network device 300. For example, in some implementations, the controller 312 may be an independent entity.

The memory 316 may include a static random access memory (SRAM), a dynamic random access memory (DRAM), a flash memory, an EEPROM, or any suitable memory. The memory 316 may store sets of features 318, sets of priorities 320, and a mapping table 322. Each set of features from the sets of features 318 may include a plurality of features supported by a given priority arbiter. In one implementation, one set of features from the sets of features 318 may be supported by one of the priority arbiters 306a-306m. An example set of features may include ACL, STP, longest prefix match (LPM), L3-options, L3-tunneling, QoS, L2-bridging, VLAN-table, and port-VLAN-table.

The sets of priorities 320 may include priorities associated with different priority arbiters. In one implementation, a first set of priorities from the sets of priorities 320 may be associated with a priority arbiter 306a and a second set of priorities from the sets of priorities 320 may be associated with a priority arbiter 306b, and an $M^{th}$ set of priorities from the sets of priorities 320 may be associated with a priority arbiter 306m. Each priority arbiter may generate a respective decision based on the set of priorities associated with the set of features supported by a given priority arbiter. The controller 312 may be configured to program each priority arbiter with the respective set of features 318 and the set of priorities 320. In some implementations, the sets of features 318 and the sets of priorities 320 for each priority arbiter may be programmed at the power up time or reset.

The mapping table 322 may be used to map a VRF subsystem to a priority arbiter from the plurality of priority arbiters 306a-306m. The mapping may be used to select an output decision for forwarding the incoming packet. In one implementation, the mapping table 322 may store mapping of a VRF ID to a priority arbiter ID. For example, the mapping may represent an association of a VRF subsystem associated with the VRF ID with a particular priority arbiter associated with the priority arbiter ID. In some embodiments, a VRF ID associated with the incoming packet 112 may be determined based on a configuration. For example, the VRF ID may be determined by the VRF classification logic 102. The VRF classification logic 102 may associate the VRF ID to a VRF subsystem to which the classified incoming packet 112 may belong to. The priority arbiter ID may be used to identify the priority arbiter that supports the set of features which meets the functional requirements of the said VRF subsystem. In some embodiments, mapping of different VRF IDs to corresponding priority arbiter IDs may be predetermined (e.g., by a network administrator) and stored in the mapping table 322 at power up or system initialization. In some embodiments, mapping of different VRF IDs to the corresponding priority arbiter IDs may be implemented in hardware. An example mapping table is illustrated in FIG. 8.

The VRF subsystems 304a-304n may include a plurality of VRF subsystems, e.g., a VRF subsystem 304a, a VRF subsystem 304b, . . . , a VRF subsystem 304n. As discussed with reference to FIG. 1, the VRF subsystems 304a, VRF subsystem 304b, . . . , VRF subsystem 304n may be similar to the first VRF subsystem 104, second VRF subsystem 106, . . . , $N^{th}$ VRF subsystem 108. Each of the VRF subsystems 304a-304n may include a respective plurality of packet processors, e.g., a routing module, a bridging module, an ACL module and a QoS module. In some embodiments, a VRF ID may be associated with each VRF subsystem from the VRF subsystems 304a-304n. The VRF ID may be determined by the VRF classification logic 102 or by the controller 312. Each VRF subsystem may be configured to process the incoming packet based on functionalities supported by a respective VRF subsystem. For example, multiple packet processors associated with each VRF subsystem may support certain functionalities. In some embodiments, the routing module may support LPM, L3-options, L3-tunneling functionalities, and the bridging module may support STP, L2-bridging, VLAN-table, port-VLAN-table functionalities.

Each packet processor configured to participate in making a decision about the incoming packet 112 can provide a respective action code to each of the priority arbiters 306a-306m. Each packet processor corresponding to a VRF subsystem may generate a respective action code based on certain functionalities supported by that VRF subsystem and certain parts of the incoming packet 112, e.g., the packet header. In some implementations, the action code may include an alphanumeric value (e.g., 8-bit or 16-bit). For example, a value of the action code may correspond to a system event, e.g., broadcast packet, multicast packet, VLAN check fail, STP check fail, IP time-to-live (TTL) error, ACL security hit, LPM routing table hit, IPv4 options hit, address resolution protocol (ARP) needed, maximum transmission unit (MTU) error, etc. An action code can correspond to a decision that can be made regarding the packet. For example, the decision may be to drop the packet, mirror the packet, forward the packet, forward the packet to the CPU, or copy the packet to the CPU. Note that some embodiments can also support other types of decisions which are not discussed in this specification, without deviating from the scope of disclosed technologies.

The priority arbiters 306a-306m may include a plurality of priority arbiters, e.g., a priority arbiter 306a, a priority arbiter 306b, . . . , a priority arbiter 306m. Each priority arbiter from the priority arbiters 306a-306m may be logically connected to each VRF subsystem from the VRF subsystems 304a-304n. Each VRF subsystem may represent an isolated virtual instance of the same physical packet routing and forwarding subsystem that may be connected to each priority arbiter via a physical connection. Hence, a logical connection between each priority arbiter and a VRF subsystem may imply a respective virtual connection using the same physical connection. For example, as shown in FIG. 4, the first priority arbiter 306a may be logically connected to the first VRF subsystem 304a via a logical connection 412 and to the $N^{th}$ VRF subsystem 304n via a logical connection 414. Similarly, the $M^{th}$ priority arbiter 306m may be logically connected to the first VRF subsystem 304a, . . . , and the $N^{th}$ VRF subsystem 304n. In some embodiments, each priority arbiter may include a multiplexer or similar logic to accept action codes from one out of the plurality of VRF subsystems associated with that priority arbiter.

In some embodiments, one priority arbiter may be assigned to one or more VRF subsystems based on the set of features supported by that priority arbiter that meet the functional requirements of those one or more VRF subsystems. Each priority arbiter from the priority arbiters 306a-306m can be programmed with a set of priorities to support features associated with one or more VRF subsystems from the VRF subsystems 304a-304n. The set of priorities corresponding to a priority arbiter may be programmed by the controller 312 based on the set of features supported by that priority arbiter. For example, a first set of priorities from the set of priorities 320 may be programmed for the priority arbiter 306a based on a first set of features from the sets of features 318 supported by the priority arbiter 306a. A second set of priorities from the set of priorities 320 may be programmed for the priority arbiter 306b based on a second set of features from the sets of features 318 supported by the priority arbiter 306b. An $M^{th}$ set of priorities from the set of priorities 320 may be programmed for the priority arbiter 306m based on an $M^{th}$ set of features from the sets of features 318 supported by the priority arbiter 306m. The priority arbiters 306a-306m may be implemented in software, hardware or a combination thereof.

Each active priority arbiter may be configured to receive action codes from participating packet processors associated with a given VRF subsystem. Each active priority arbiter may further be configured to generate a decision for the given VRF subsystem based on a mapping of the action codes to corresponding priorities. In one implementation, the controller 312 may provide the mapping of the action codes to corresponding priorities to each priority arbiter assigned to a VRF subsystem. In another implementation, the controller 312 may store the mapping associated with each priority arbiter in a memory (e.g., a register) of the respective priority arbiter. Each priority arbiter can make a decision regarding the packet based on a priority value corresponding to each action code. In some embodiments, the decision with a highest priority value may prevail. Each priority arbiter can provide its respective decision to the arbiter selector 308.

The arbiter selector 308 may be configured to receive decisions from each of the priority arbiters 306a-306m. The arbiter selector 308 may also be configured to select an output decision 324 from a plurality of decisions generated by the priority arbiters 306a-306m based on a mapping of the given VRF subsystem to a priority arbiter. For example, the arbiter selector 308 may select the output decision 324 from a decision generated by a priority arbiter which is associated with the priority arbiter ID. In one implementation, the priority arbiter ID may be determined using the mapping table 322. The arbiter selector 308 may be implemented using multiplexers or any suitable logic. The arbiter selector 308 may provide the output decision 324 from the selected priority arbiter to the decision logic 310.

The decision logic 310 may be configured to perform an action corresponding to the output decision 324 on the incoming packet 112. For example, the action may be to drop the packet, mirror the packet, forward the packet to another device, forward the packet to the CPU, or copy the packet to the CPU. Note that the decision logic 310 may perform other suitable actions within the scope of the disclosed technologies, which are not covered in this specification. The decision logic 310 may include any suitable implementation, e.g., hardware, software, or a combination thereof.

FIG. 4 illustrates an apparatus 400 utilizing multiple priority arbiters, in one embodiment of the disclosed technologies. The apparatus 400 may be part of the network device 300 as discussed with reference to FIG. 3.

The first VRF subsystem 304a may include a plurality of packet processors, e.g., a routing module 402a, a bridging module 402b, an ACL module 402c and a QoS module 402d. The routing module 402a, bridging module 402b, ACL module 402c and the QoS module 402d may be similar to the routing module 202a, bridging module 202b, ACL module 202c and the QoS module 202d as described with reference to FIG. 2. The $N^{th}$ VRF subsystem 304n may include a plurality of packet processors, e.g., a routing module 404a, a bridging module 404b, an ACL module 404c, and a QoS module 404d. The routing module 404a, bridging module 404b, ACL module 404c, and the QoS module 404d may be similar to the routing module 204a, bridging module 204b, ACL module 204c, and the QoS module 204d as described with reference to FIG. 2.

According to the embodiments, each priority arbiter, e.g., the first priority arbiter 306a, the second priority arbiter 306b, $M^{th}$ priority arbiter 306m, may be logically connected to the plurality of VRF subsystems, e.g., the first VRF subsystem 304a, the second VRF subsystem 304b, . . . , the $N^{th}$ VRF subsystem 304n. In one embodiment, the first priority arbiter 306a may support a set of features that may meet the functional requirements of the first VRF subsystem 304a and can be assigned to the first VRF subsystem 304a. In another embodiment, the first priority arbiter 306a may support a set of features that may meet the functional requirements of the first VRF subsystem 304a and the $N^{th}$ VRF subsystem 304n and can be assigned to the first VRF subsystem 304a and the $N^{th}$ VRF subsystem 304n.

Different sets of features supported by different priority arbiters are discussed with the help of FIGS. 5A, 5B, and 5C. FIG. 5A shows a first set of features 500. FIG. 5B shows a second set of features 502. FIG. 5C shows an $M^{th}$ set of features 504. In some implementations, the first set of features 500, second set of features 502 and the $M^{th}$ set of features 504 may be part of the sets of features 318 as discussed with reference to FIG. 3.

As illustrated in FIG. 5A, the first set of features 500 may include ACL, STP, LPM, L3-options, L3-tunneling, QoS, L2-bridging, VLAN-table and port-VLAN-table. The second set of features 502 may include ACL, LPM, L3-options, L3-tunneling, QoS, L2-bridging, VLAN-table, and port-VLAN-table. The $M^{th}$ set of features 504 may include ACL, LPM, L3-options, L3-tunneling, and QoS. In some embodiments, the first set of features 500 may be supported by the first priority arbiter 306a, the second set of features 502 may be supported by the second priority arbiter 306b, and the $M^{th}$ set of features 504 may be supported by the $M^{th}$ priority arbiter 306m.

In some implementations, an LPM may be determined by comparing IP addresses from the packet header against various length prefixes. The routing module may generate a decision to forward the packet to an output port specified by the longest matching prefix when there is an LMP routing table hit. If a match is not found in the routing table, the routing module may generate a decision to drop the packet. In one implementation of the routing table, an LPM may be determined using {key, mask} pairs. However, any suitable implementation of the routing tables is possible.

In some implementations, the routing module may be configured to process L3-options included in the packet 112. For example, in some instances, a packet may include optional IP options fields that can provide additional information on how to handle the packet. The routing module may provide an appropriate action code to the priority arbiter when there is an IPv4 options hit. The routing module may provide an appropriate action code to the priority arbiter when there is an IPv6 extension headers hit. The L3-options fields may include option types, option length, and option numbers. The option numbers may include different values for different options, e.g., trace-route, record-route, time-stamp, security classification, source-routes, route-alert, etc. The record-route option may allow recording the route of the packet within the packet header, e.g., by recording an IP address of each device that handles the packet. The time-stamp option may allow recording a time-stamp instead of the IP address. The route-alert option may allow dropping the packet if a route is not found in the routing table.

In some implementations, the routing module may process an encapsulated packet that may be using L3-tunneling. For example, the L3-tunneling may include IP-in-IP tunneling or generate routing encapsulation (GRE) tunneling. In some implementations, an IP packet may be encapsulated inside another packet to route other network layer protocols over IP networks. In some implementations, the packet 112 may include an inner IP header and an outer IP header with the payload for IP-in-IP tunneling. In some other implementations, the packet 112 may also include an GRE header for GRE tunneling. The GRE tunnel can support multicast traffic and IPv6 protocol as compared to the IP-in-IP tunnel.

The STP may be used to prevent loops when there are redundant paths in a network, e.g., an Ethernet local area network. The STP can create a spanning tree within a network of connected L2 bridges (e.g., Ethernet switches), and disable those links that are not part of the spanning tree, leaving a single active path between any two network nodes. In some implementations, the bridging module may generate an appropriate action code to the priority arbiter when there is an STP check fail.

The L2-bridging may determine if a destination L2-address (e.g., source MAC address) of the incoming packet 112 is known and may forward the packet 112 to the port where the destination address is located. If the source L2-address (e.g., source MAC-address) of the incoming packet 112 is not known, the address may be learned, so that if any packets arrive with this source as their destination, they can be forwarded to the port on which this packet just arrived. In the scenario when destination MAC of a packet is known, but source is still unknown, then default behavior of the L2-bridging may be to forward the packet to the destination and in parallel, process the packet to learn the source.

The bridging module may also be configured to support certain VLAN functionalities and provide appropriate action codes for those functionalities. For example, the VLAN table may store a VLAN membership that may be used to verify if the incoming packet belongs to a specific VLAN in order to perform certain actions. For example, the actions may include membership verification, flooding of packets for unknown destination addresses, or learning of unknown addresses. In some implementations, the bridging module may generate an appropriate action code to the priority arbiter when there is a VLAN check fail. The port-VLAN-table may be used to maintain port-to-VLAN membership. In addition, the port-VLAN-table may be used for checking membership information for an ingress packet on a port and to assign VLAN to ingress packets.

The ACL may be configured to support security ACL, policy based routing ACL, or the QoS ACL functionalities. For example, the security ACL may be used to enforce security rules for the network device 300 and the network. The policy based routing ACL may be used to implement policy based routing. The QoS ACL may examine a packet and may recommend specific treatment in terms of class of service provided to a packet. In some implementations, the ACL module may generate an appropriate action code to the priority arbiter when there is an ACL security hit.

FIG. 6 illustrates a table 600 showing examples of various action codes, in one embodiment of the disclosed technology. The table 600 illustrates a system event 600a and a corresponding action code 600b. An action code may be assigned by a participating packet processor of a VRF subsystem based on a system event as a result of packet processing. Referring back to FIG. 4, in some embodiments, the routing module 402a, bridging module 402b, ACL module 402c, and the QoS module 402d may be configured to process the incoming packet 112 and provide a respective action code to a first priority arbiter 306a. For example, as illustrated in the table 600, in one instance, the routing table 402a may process the incoming packet 112 and generate an action code equal to "27" if there is a LPM routing table hit, and the bridging module 402b may process the incoming packet 112 and generate an action code equal to "14" if there is a VLAN check fail. The ACL module 402c and the QoS module 402d may not process the incoming packet 112.

Referring back to FIG. 4, in some embodiments, the routing module 404a, bridging module 404b, ACL module 404c, and the QoS module 404d may be configured to process the incoming packet 112 and provide a respective action code to an $M^{th}$ priority arbiter 306m. For example, as illustrated in the table 600, the routing table 402a may process the incoming packet 112 and generate an action code equal to "26" if there is an IP time-to-live (TTL) error. The bridging module 404b may process the incoming packet 112 and generate an action code equal to "15" if there is an STP check fail. The ACL module 404c may process the incoming packet 112 and generate an action code equal to "31" if there is an ACL security hit. The QoS module 404d may process the incoming packet 112 and generate an action code equal to "32" if there is a QoS miss.

According to some embodiments, each of the priority arbiters may be configured to map the action codes received from the respective packet processors to corresponding priority values for generating a final decision. In some embodiments, the controller 312 may configure each priority arbiter from the priority arbiters 306a-306m with a mapping of action codes to a set of priorities associated with each respective priority arbiter at power up. In some implementations, each priority arbiter may be programmed prior to receiving of any incoming packet at the apparatus 400. FIGS. 7A, 7B, and 7C illustrate tables 700, 702, and 704 including mapping of the action codes to priority values and their corresponding decisions. The table 700 may include a priority 700b and a decision 700c corresponding to an action code 700a. The table 702 may include a priority 702b and a decision 702c corresponding to an action code 702a. The table 704 may include a priority 704b and a decision 704c corresponding to an action code 704a. The action codes 700a, 700b, and 700c may be similar to the action code 600b as described with reference to FIG. 6. In some embodiments, the table 700 may be associated with the first priority arbiter 306a, the table 702 may be associated with the second priority arbiter 306b, and the table 704 may be associated with the M$^{th}$ priority arbiter 306m. In one embodiment, the mapping of the action codes to corresponding priority values for each priority arbiter may be stored in the memory 316 and provided by the controller 312 to the respective priority arbiter. In another embodiment, mapping for each priority arbiter may be stored in the respective priority arbiter, e.g., in a register or a suitable memory (not shown). For example, the table 700 may be stored in the first priority arbiter 306a, the table 702 may be stored in the second priority arbiter 306b, and the table 704 may be stored in the M$^{th}$ priority arbiter 306m.

Referring back to FIG. 4, the first priority arbiter 306a may generate a decision 406 based on the mapping of the action codes received from the first VRF subsystem 304a to the corresponding priorities, as illustrated in FIG. 7A. For example, the action code "14" may be mapped to a priority value "98" and the action code "27" may be mapped to a priority value "40." The first priority arbiter 306a may consider the action codes received from all the participating packet processors and select the decision 406 based on a decision corresponding to the highest priority value. For example, the decision corresponding to the priority value "98" may be to drop the packet. The first priority arbiter 306a may provide the decision 406 to drop the packet to the arbiter selector 308.

Referring back to FIG. 4, the M$^{th}$ priority arbiter 306m may generate a decision 408 based on the mapping of the action codes received from the N$^{th}$ VRF subsystem 304n to the corresponding priorities, as illustrated in FIG. 7C. For example, the action code "26" may be mapped to a priority value "25", the action code "15" may be mapped to a priority value "32", the action code "31" may be mapped to a priority value "85", and the action code "32" may be mapped to a priority value "38." The M$^{th}$ priority arbiter 306m may consider the action codes received from all the participating packet processors and select the decision 408 based on a decision corresponding to the highest priority value. For example, the decision corresponding to the priority value 85 may be to forward the packet. The M$^{th}$ priority arbiter 306m may provide the decision 408 to forward the packet to the arbiter selector 308.

Referring back to FIG. 4, the arbiter selector 308 may receive the decisions 406 and 408 and select the output decision 324 based on a priority arbiter identifier (ID). As discussed with reference to FIG. 3, the priority arbiter ID may be generated using the mapping table 322. A mapping of the VRF ID to a priority arbiter ID is discussed with reference to FIG. 8.

FIG. 8 illustrates an example of the mapping table 322 in one embodiment of the disclosed technology. The mapping table 322 may include a VRF ID 800 and the corresponding priority arbiter ID 410. The priority arbiter ID 410 may be associated with a priority arbiter from the plurality of priority arbiters. As illustrated in the mapping table 322, a value "1" for the VRF ID 800 corresponding to the first VRF subsystem 304a may be mapped to a value of "1" for the priority arbiter ID 410 corresponding to the first priority arbiter 306a. A value "12" for the VRF ID 800 corresponding to the N$^{th}$ VRF subsystem 304n may be mapped to a value of "6" for the priority arbiter ID 410 corresponding to the M$^{th}$ priority arbiter 306m. In some embodiments, one priority arbiter can be assigned to a plurality of VRF subsystems. For example, as shown in the mapping table 322, the priority arbiter ID 410 with a value "4" is mapped to a first VRF subsystem with the VRF ID 800 value of "10" and a second VRF subsystem with the VRF ID 800 value of "11." According to the embodiments, the VRF ID 800 for a specific VRF subsystem may be mapped to the priority arbiter ID 410 for selecting the output decision 324 associated with the specific VRF subsystem.

Referring back to FIG. 4, in one instance, the arbiter selector 308 may select the decision 406 as the output decision 324 if the priority arbiter ID 410 corresponds to the first priority arbiter 306a, e.g., the VRF ID 800 is "1." For example, the arbiter selector 308 may select the decision 406 to drop the packet and the decision logic 310 may perform the decision by dropping the packet 112. In another instance, the arbiter selector 308 may select the decision 408 as the output decision 324 if the priority arbiter ID 410 corresponds to the M$^{th}$ priority arbiter 306m, e.g., the VRF ID 800 is "12." For example, the arbiter selector 308 may select the decision 408 to forward the packet and the decision logic 310 may perform the decision by forwarding the packet 112.

Figure 9:
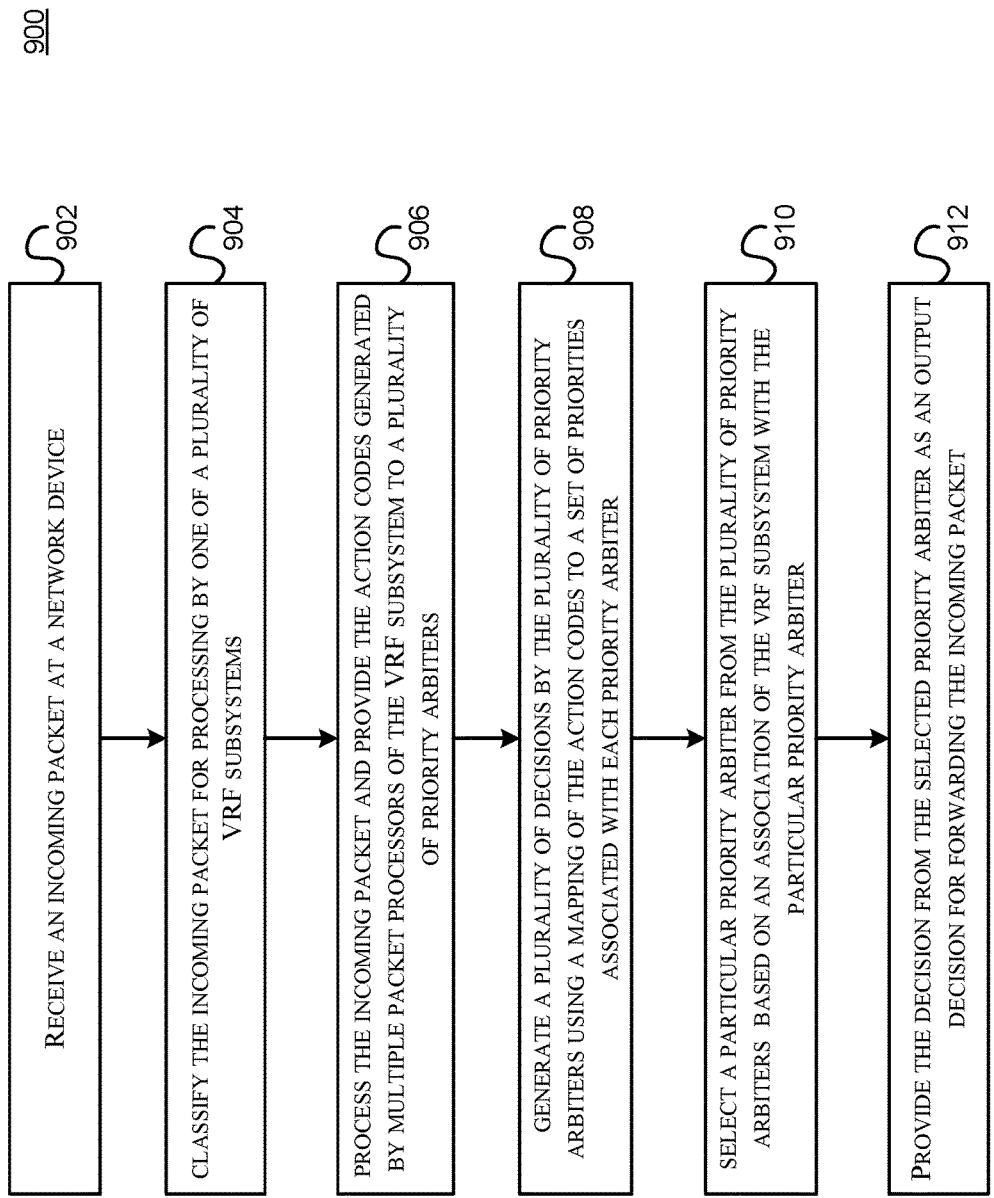
FIG. 9 illustrates a computer implemented method for packet forwarding using multiple priority arbiters in one embodiment of the disclosed technologies.

FIG. 9 illustrates a computer implemented method 900 for packet forwarding using multiple priority arbiters in one embodiment of the disclosed technologies. The method 900 may be performed by the network device 300 as discussed with reference to FIG. 3.

In step 902, an incoming packet may be received by a network device. As discussed with reference to FIG. 3, the network device 300 may receive the incoming packet 112 via the input interface 302. In some implementations, the incoming packet 302 may include only parts of the header. For example, the header may include source and destination physical addresses (e.g., IP addresses of respective devices), a protocol version (e.g., IPv4 or IPv6), a length of the packet, error correction data, and any other useful information.

In step 904, the incoming packet may be classified for processing by one of a plurality of VRF subsystems. As discussed with reference to FIG. 3, the incoming packet 112 may be classified by the VRF classification logic 102 for processing by one of the VRF subsystems from the VRF subsystems 304a-304n. Each VRF subsystem may include a plurality of packet processors as discussed with reference to FIG. 4. In some embodiments, the VRF classification logic 102 may determine a VRF ID associated with the packet 112 and send the packet 112 to the VRF subsystem associated with that VRF ID. In one instance, based on the classification, the packet 112 may be sent to the first VRF subsystem 304a for processing by multiple packet processors of the first VRF subsystem 304a. For example, a value "1" for the VRF ID may be associated with the first VRF subsystem 304a.

In step 906, the incoming packet may be processed by the VRF subsystem and the action codes generated by multiple packet processors of the VRF subsystem may be provided to a plurality of priority arbiters. For example, as discussed with reference to FIG. 4, the routing module 402a, bridging module 402b, ACL module 402c, and the QoS module 402d may provide respective action codes to the plurality of priority arbiters 306a-306m. The respective action codes may be generated based on certain functionalities supported by the first VRF subsystem 304a and the packet header of the packet 112.

In step 908, a plurality of decisions may be generated by the plurality of priority arbiters using a mapping of the action codes to a set of priorities associated with each priority arbiter. As discussed with reference to FIG. 3, the controller 312 may configure each priority arbiter with the set of priorities from the sets of priorities 320 corresponding to the set of features from the sets of features 318 at system initialization. The first priority arbiter may generate the decision 406 and the $M^{th}$ priority arbiter may generate the decision 408 based on the respective mappings.

In step 910, a particular priority arbiter may be selected from the plurality of priority arbiters based on an association of the VRF subsystem with the particular priority arbiter. For example, as discussed with reference to FIG. 4, the first priority arbiter 306*a* may be selected by the arbiter selector 308 based on the priority arbiter ID 410. For example, the priority arbiter ID 410 may be provided by the mapping table 322.

In step 912, the decision from the selected priority arbiter may be provided as an output decision for forwarding the incoming packet. For example, as discussed with reference to FIG. 4, the decision 406 may be provided from the first priority arbiter 306*a* as the output decision 324. The output decision 324 may be used by the decision logic 310 for performing an action related to the output decision 324 on the packet 112. For example, the decision can be to drop the packet, forward the packet to another device or to a central processor unit (CPU), or copy to the CPU.

Figure 10:
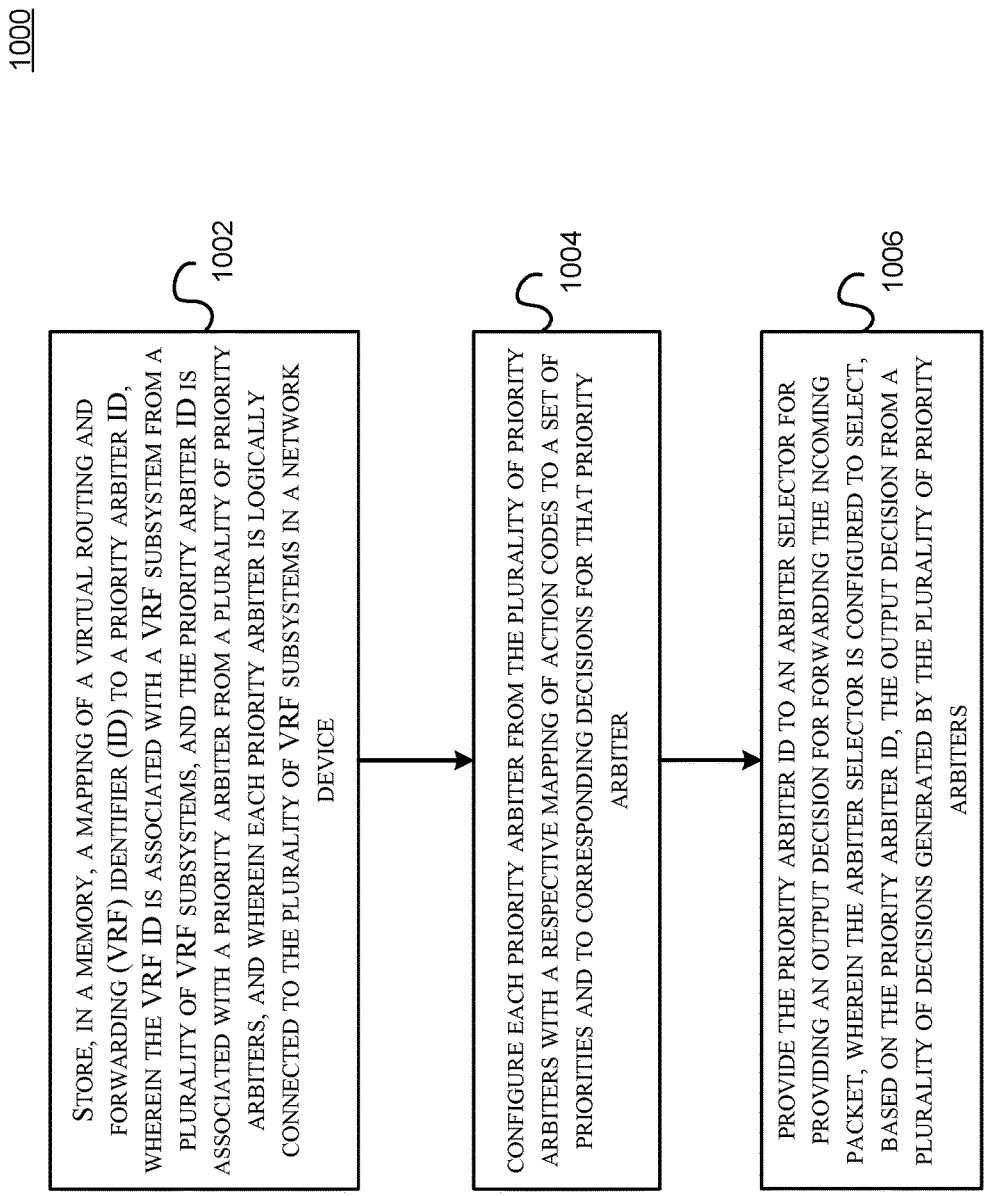
FIG. 10 illustrates a computer implemented method executed by a controller, in one embodiment of the disclosed technologies.

FIG. 10 illustrates a computer implemented method 1000 executed by a controller, in one embodiment of the disclosed technologies. The method 1000 may be performed by the controller 312, as discussed with reference to FIG. 3.

In step 1002, a mapping of a VRF ID to a priority arbiter ID may be stored in a memory by a processor. The VRF ID may be associated with a VRF subsystem from a plurality of VRF subsystems, and the priority arbiter ID may be associated with a priority arbiter from a plurality of priority arbiters. Each priority arbiter may be logically connected to the plurality of VRF subsystems in a network device. As discussed with reference to FIG. 3 for the network device 300, the processor 314 may store the predetermined mapping of a VRF ID to a priority arbiter ID in the memory 316 (e.g., in the mapping table 322). One priority arbiter may be mapped to one or more VRF subsystems as discussed with reference to the mapping table 322 in FIG. 8.

In step 1004, each priority arbiter from the plurality of priority arbiters can be configured with a respective mapping of action codes to a set of priorities and to corresponding decisions for that priority arbiter. As discussed with reference to FIGS. 7A, 7B, and 7C, each priority arbiter from the priority arbiters 306*a*-306*m* can be configured with a mapping of the set of priorities and the corresponding decisions. In some embodiments, the controller 312 may program each priority arbiter with its respective mapping at system initialization or power up time. It will be understood that the steps 1002 and 1004 may be performed in any order without deviating from the scope of the disclosed technologies.

In step 1006, the priority arbiter ID may be provided to an arbiter selector for providing an output decision for forwarding the incoming packet. The arbiter selector may be configured to select, based on the priority arbiter id, the output decision from a plurality of decisions generated by the plurality of priority arbiters. As discussed with reference to FIG. 4, the priority arbiter ID 410 may be provided to the arbiter selector 308 for providing the output decision 324. The output decision 324 may be selected from the decision 406 and the decision 408 provided by the first priority arbiter 306*a* and the $M^{th}$ priority arbiter 306*m* respectively.

Various embodiments of the disclosed technologies utilize multiple priority arbiters to support different programmable priorities for different VRF subsystems. Each VRF subsystem can be logically connected to each of the priority arbiters. Each priority arbiter can be programmed with a set of priorities to support features associated with one or more VRF subsystems. The set of priorities corresponding to a priority arbiter may be programmed by a controller based on the set of features supported by that priority arbiter. Packet forwarding decisions for a given VRF subsystem may be forwarded to all the active priority arbiters. Each priority arbiter can generate a respective decision on forwarding the packet. A final decision from a priority arbiter is selected based on a pre-determined mapping of the given VRF subsystem to that priority arbiter. Embodiments of the disclosed technologies can provide a flexible and easy to maintain architecture for a network device as compared to network devices that utilize only a single priority arbiter.

Figure 11:
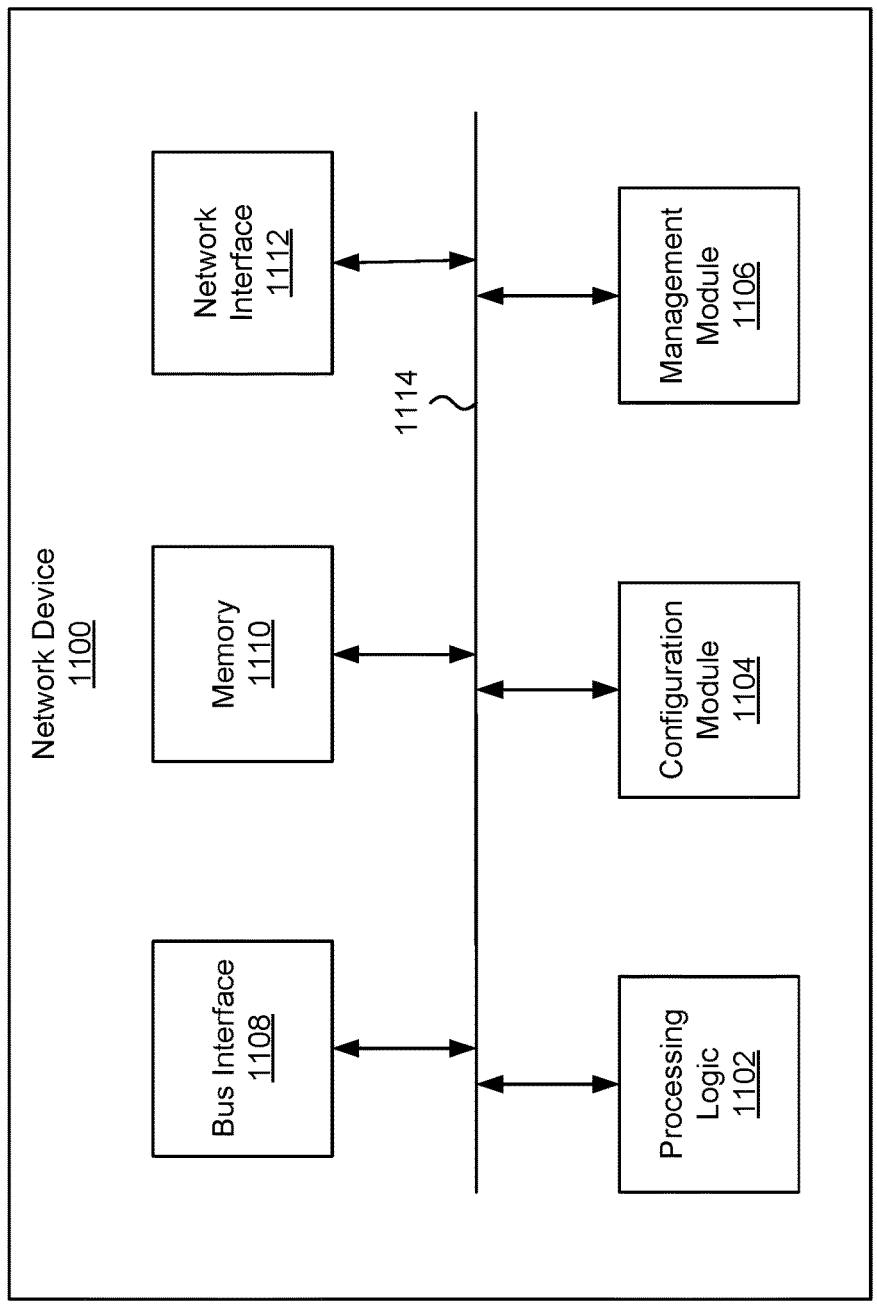
FIG. 11 illustrates an example of a network device, according to certain aspects of the disclosure.

FIG. 11 illustrates an example of a network device 1100. Functionality and/or several components of the network device 1100 may be used without limitation with other embodiments disclosed elsewhere in this disclosure, without limitations. In some embodiments, the network device 1100 may include some components of the network device 300 as discussed with reference to FIG. 3. For example, the network device 1100 may include the priority arbiters 306*a*-306*m*, and the arbiter selector 308. A network device 1100 may facilitate processing of packets and/or forwarding of packets from the network device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1100 may be the recipient and/or generator of packets. In some implementations, the network device 1100 may modify the contents of the packet before forwarding the packet to another device. The network device 1100 may be a peripheral device coupled to another computer device, a switch, a router or any other suitable device enabled for receiving and forwarding packets.

In one example, the network device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The network device 1100 may include additional modules, not illustrated here, such as components discussed with respect to the nodes disclosed in FIG. 11. In some implementations, the network device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110. In some embodiments, the processing logic 1102 may include the processor 314.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the network device 1100, while in other cases some or all of the memory may be external to the network device 1100. The memory 1110 may store an operating system comprising executable instructions that, when executed by the processing logic 1102, provides the execution environment for executing instructions providing networking functionality for the network device 1100. The memory may also store and maintain several data structures and routing tables for facilitating the functionality of the network device 1100. In some embodiments, the memory 1110 may also include the memory 316, as discussed with reference to FIG. 3.

In some implementations, the configuration module 1104 may include one or more configuration registers. Configuration registers may control the operations of the network device 1100. In some implementations, one or more bits in the configuration register can represent certain capabilities of the network device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the network device 1100.

In some implementations, the management module 1106 may be configured to manage different components of the network device 1100. In some cases, the management module 1106 may configure one or more bits in one or more configuration registers at power up, to enable or disable certain capabilities of the network device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the network device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1100 may include multiple network interface modules, each configured to communicate with a different network. For example, in these implementations, the network device 1100 may include a network interface module for communicating with a wired Ethernet network, a wireless 802.11 network, a cellular network, an Infiniband network, etc.

The various components and modules of the network device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
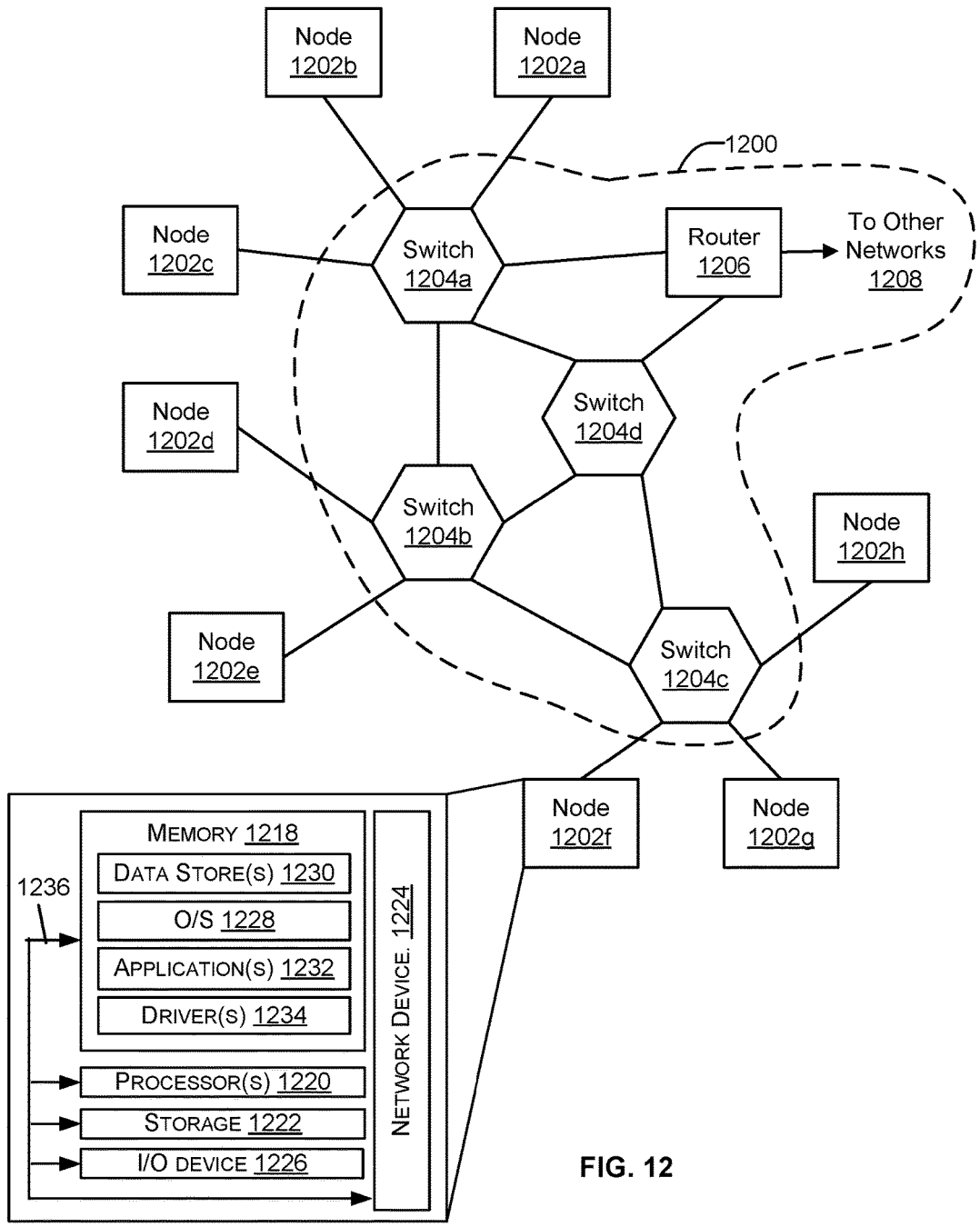
FIG. 12 illustrates an example architecture for features and systems described herein that include one or more service provider computers and/or a user device connected via one or more networks, according to certain aspects of the disclosure.

FIG. 12 illustrates a network 1200, illustrating various different types of network devices 1100 of FIG. 11, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes. In some embodiments, the network device 300 may be similar to one of the switches 1204a-1204d or the router 1206.

The network 1200 may also include one or more network devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. The network device(s) 1224 of FIG. 12 may include similar components discussed with reference to the network device 1100 of FIG. 11.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as, for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
    an input interface configured to receive an incoming packet via a network, the incoming packet comprising a packet header;
    a virtual routing and forwarding (VRF) classification logic configured to classify the incoming packet for processing;
    a plurality of VRF subsystems, each VRF subsystem comprising a plurality of packet processors comprising one or more routing tables, wherein each packet processor for a given VRF subsystem is configured to process the incoming packet and generate a respective action code based on certain functionalities supported by the given VRF subsystem and the packet header;
    a plurality of priority arbiters, each priority arbiter logically connected to each of the VRF subsystems, wherein each priority arbiter is configured to generate a respective forwarding decision for the incoming packet based on a mapping of action codes representing different types of system event to a set of priorities associated with a respective priority arbiter; and
    an arbiter selector configured to provide an output decision for the incoming packet from a plurality of forwarding decisions generated by the priority arbiters based on a mapping of the given VRF subsystem to one of the priority arbiters,
    wherein the classifying the incoming packet comprises assigning the incoming packet to one of the plurality of VRF subsystems.

2. The network device of claim 1, wherein the mapping of action codes to the set of priorities associated with each priority arbiter is provided by a controller.

3. The network device of claim 1, further comprising a decision logic configured to perform an action corresponding to the output decision on the incoming packet.

4. The network device of claim 1, wherein the network device is implemented as an application specific integrated circuit (ASIC), a system on chip (SoC), a system in package (SiP) or a field programmable gate array (FPGA).

5. An apparatus, comprising:
    a plurality of virtual routing and forwarding (VRF) subsystems, each VRF subsystem comprising multiple packet processors comprising one or more routing tables, wherein an incoming packet is assigned to a given VRF subsystem, wherein each packet processor for the given VRF subsystem is configured to process the incoming packet based on certain functionalities supported by the given VRF subsystem;

a plurality of priority arbiters, each priority arbiter logically connected to each of the plurality of the VRF subsystems, wherein each priority arbiter is configured to generate a respective decision for forwarding the incoming packet based on action codes representing different types of system event and a set of priorities associated with that priority arbiter; and an arbiter selector configured to provide an output decision for forwarding the incoming packet based on respective decisions generated by the plurality of priority arbiters.

6. The apparatus of claim 5, wherein the set of priorities associated with each priority arbiter is programmed by a controller prior to receiving of any incoming packet at the apparatus.

7. The apparatus of claim 6, wherein the set of priorities associated with each priority arbiter is programmed based on a set of features supported by a given priority arbiter.

8. The apparatus of claim 7, wherein the set of features supported by the given priority arbiter correspond to the certain functionalities supported by the given VRF subsystem.

9. The apparatus of claim 6, wherein the arbiter selector provides the output decision for forwarding the incoming packet based on a mapping of the given VRF subsystem to a specific priority arbiter from the plurality of priority arbiters.

10. The apparatus of claim 9, wherein the mapping of the given VRF subsystem to the specific priority arbiter is provided by the controller.

11. The apparatus of claim 5, wherein each priority arbiter generates the respective decision for forwarding the incoming packet based on a highest priority value from the set of priorities associated with that priority arbiter.

12. The apparatus of claim 9, wherein one VRF subsystem is mapped to one priority arbiter from the plurality of priority arbiters.

13. The apparatus of claim 9, wherein more than one VRF subsystems are mapped to a same priority arbiter from the plurality of priority arbiters.

14. The apparatus of claim 5, wherein the output decision for forwarding the incoming packet includes "forward", "forward to a central processing unit (CPU)", "copy to the CPU" or "drop."

15. The apparatus of claim 5, wherein the multiple packet processors include a routing module, a bridging module, an access control list (ACL) module and a quality of service (QoS) module.

16. The apparatus of claim 5, wherein the apparatus is part of a network device.

17. A computer implemented method comprising:

storing, by a processor, in a memory, a mapping of a virtual routing and forwarding (VRF) identifier (ID) to a priority arbiter ID, wherein the VRF ID is associated with a VRF subsystem from a plurality of VRF subsystems, each VRF subsystem comprising multiple packet processors configured to process an incoming packet based on functional requirements of the VRF subsystem, each of the multiple packet processors comprising one or more routing tables, and the priority arbiter ID is associated with a priority arbiter from a plurality of priority arbiters, wherein each priority arbiter is logically connected to the plurality of VRF subsystems in a network device;

configuring each priority arbiter from the plurality of priority arbiters with a respective mapping of action codes representing different types of system event to a set of priorities and to corresponding decisions for that priority arbiter; and generating, by an arbiter selector, an output decision for the incoming packet.

18. The method of claim 17, wherein each packet processor is being configured for processing the incoming packet received via a network, and wherein the action codes are generated by the multiple packet processors for the incoming packet.

19. The method of claim 17, wherein each priority arbiter is configured to generate a respective decision based on a highest priority from the set of priorities associated with the respective priority arbiter.

20. The method of claim 19, further comprising:

providing the priority arbiter ID to the arbiter selector for providing the output decision for forwarding the incoming packet, wherein the arbiter selector is configured to select, based on the priority arbiter ID, the output decision from a plurality of decisions generated by the plurality of priority arbiters.

* * * * *